United States Patent
Lenz

(10) Patent No.: US 12,122,723 B2
(45) Date of Patent: Oct. 22, 2024

(54) PREFORM FOR CERAMIC MATRIX COMPOSITE, METHOD OF MAKING A CERAMIC MATRIX COMPOSITE AND CERAMIC MATRIX COMPOSITE

(71) Applicant: RTX Corporation, Farmington, CT (US)

(72) Inventor: Brendan M. Lenz, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 1109 days.

(21) Appl. No.: 16/692,539

(22) Filed: Nov. 22, 2019

(65) Prior Publication Data

US 2021/0155553 A1 May 27, 2021

(51) Int. Cl.
*C04B 35/628* (2006.01)
*C04B 35/80* (2006.01)

(52) U.S. Cl.
CPC ............ *C04B 35/62884* (2013.01); *C04B 2235/3217* (2013.01); *C04B 2235/3222* (2013.01); *C04B 2235/3244* (2013.01); *C04B 2235/3284* (2013.01); *C04B 2235/3418* (2013.01); *C04B 2235/3463* (2013.01); *C04B 2235/3826* (2013.01); *C04B 2235/3873* (2013.01); *C04B 2235/5244* (2013.01); *C04B 2235/5252* (2013.01); *C04B 2235/614* (2013.01); *C04B 2235/764* (2013.01); *C04B 2235/94* (2013.01)

(58) Field of Classification Search
CPC ................... C04B 35/62884; C04B 35/80
See application file for complete search history.

(56) References Cited

U.S. PATENT DOCUMENTS

| | | | |
|---|---|---|---|
| 9,855,733 B2 | 1/2018 | Butler | |
| 9,908,305 B2 | 3/2018 | Chamberlain et al. | |
| 10,260,358 B2 | 4/2019 | Kittleson et al. | |
| 10,384,981 B2 | 8/2019 | Hall et al. | |
| 10,465,533 B2 | 11/2019 | Morgan et al. | |
| 2009/0110877 A1 | 4/2009 | Bernard et al. | |
| 2012/0052253 A1 | 3/2012 | Okoli et al. | |
| 2017/0101873 A1 | 4/2017 | Morgan et al. | |
| 2021/0024427 A1* | 1/2021 | Liliedahl | C04B 35/62857 |
| 2021/0047241 A1* | 2/2021 | Beaber | C04B 35/638 |

FOREIGN PATENT DOCUMENTS

| | | |
|---|---|---|
| EP | 1013412 A1 | 6/2000 |
| EP | 1215183 A1 | 6/2002 |

OTHER PUBLICATIONS

European Search Report for European Application No. 202007835.8; Application Filing Date: Nov. 16, 2020; Date of Action: Apr. 20, 2021; 7 pages.

\* cited by examiner

*Primary Examiner* — Matthew E. Hoban
(74) *Attorney, Agent, or Firm* — CANTOR COLBURN LLP

(57) ABSTRACT

Disclosed is a preform for a ceramic matrix composite including direct channels extending from an exterior surface of the preform to an interior space of the preform wherein the direct channels are free of char.

20 Claims, 2 Drawing Sheets

PREFORM FOR CERAMIC MATRIX COMPOSITE, METHOD OF MAKING A CERAMIC MATRIX COMPOSITE AND CERAMIC MATRIX COMPOSITE

BACKGROUND

Exemplary embodiments pertain to the art of ceramic matrix composites.

Ceramic matrix composites (CMC) have high temperature capability and are light weight. The composites are an attractive material for various applications in which high temperature durability and light weight are desired. Ceramic matrix composites can be formed by infiltrating a preform with a vapor (chemical vapor infiltration) to form the matrix. While current methods and materials may be adequate improved methods and materials are desired.

BRIEF DESCRIPTION

Disclosed is a preform for a ceramic matrix composite including direct channels extending from an exterior surface of the preform to an interior space of the preform wherein the direct channels are free of char.

In addition to one or more of the features described above, or as an alternative to any of the foregoing embodiments, the direct channels extend from a first exterior surface to a second exterior surface.

In addition to one or more of the features described above, or as an alternative to any of the foregoing embodiments, the direct channels have a diameter at the interior space of the preform that is less than the diameter at the exterior surface of the preform.

In addition to one or more of the features described above, or as an alternative to any of the foregoing embodiments, the direct channels have substantially the same diameter throughout the channel.

In addition to one or more of the features described above, or as an alternative to any of the foregoing embodiments, the direct channels have a diameter of 500 to 3000 micrometers.

In addition to one or more of the features described above, or as an alternative to any of the foregoing embodiments, at least two of the direct channels are perpendicular to each other and lie in the same plane and at least one additional direct channel is perpendicular to the plane.

Also disclosed is a method of making a ceramic matrix composite including: forming a preform having direct channels extending from an exterior surface of the preform to an interior space of the preform wherein the direct channels are free of char; and infiltrating the preform having direct channels with matrix material.

In addition to one or more of the features described above, or as an alternative to any of the foregoing embodiments, forming a preform having direct channels includes removing at least one tow per layer to make a gap in each layer.

In addition to one or more of the features described above, or as an alternative to any of the foregoing embodiments, further including aligning the gap in each layer on an alignment device.

In addition to one or more of the features described above, or as an alternative to any of the foregoing embodiments, infiltrating includes chemical vapor infiltration.

Also disclosed is a ceramic matrix composite including direct matrix channels extending from an exterior surface of the composite to an interior space of the composite wherein the direct matrix channels are free of char.

In addition to one or more of the features described above, or as an alternative to any of the foregoing embodiments, the direct matrix channels extend from a first exterior surface to a second exterior surface.

In addition to one or more of the features described above, or as an alternative to any of the foregoing embodiments, the direct matrix channels have a diameter at the interior space of the ceramic matrix composite that is less than the diameter at the exterior surface of the ceramic matrix composite.

In addition to one or more of the features described above, or as an alternative to any of the foregoing embodiments, the direct matrix channels have substantially the same diameter throughout the channel.

In addition to one or more of the features described above, or as an alternative to any of the foregoing embodiments, the direct matrix channels have a diameter of 500 to 3000 micrometers.

In addition to one or more of the features described above, or as an alternative to any of the foregoing embodiments, at least two of the matrix channels are perpendicular to each other and lie in the same plane and at least one additional matrix channel is perpendicular to the plane.

In addition to one or more of the features described above, or as an alternative to any of the foregoing embodiments, the ceramic matrix composite includes a matrix and reinforcing fiber. In some embodiments the matrix may include silicon carbide, silicon nitride or a combination thereof and the reinforcing fiber may include silicon carbide. In some embodiments the matrix and reinforcing fiber include oxide materials such as aluminum oxide, silicon dioxide, yttrium aluminum garnet, aluminosilicates, zirconium dioxide, zinc oxide, and mixtures thereof.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A ceramic matrix composite can be made by infiltrating a preform using chemical vapor infiltration. In chemical vapor infiltration the reaction product of the infiltrating gases deposits on the surface of the reinforcing fibers. Gradually the open spaces in the preform are reduced. The ceramic matrix forms faster closer to the exterior surface of the preform and can completely fill the spaces between the reinforcing fibers close to the exterior surface before infiltrating the interior of the preform, resulting in a non-uniform microstructure in the final composite and less desirable physical properties.

This problem can be addressed by employing a preform having direct channels extending from an exterior surface of the preform to an interior space of the preform. The direct channels allow the chemical infiltration gas to more completely and uniformly permeate the preform which will make the infiltration process quicker. The resulting composite has a more uniform and dense microstructure.

The term "direct" channel describes an open space having no variations in direction of more than five degrees. The channel may have any cross section shape. The diameter (or width) of the channel may be the same (vary by less than 5%) at the exterior and interior or the channel may be tapered—having width at the exterior surface which is greater than the width at an interior space. The width of the channel may be 500 to 3000 micrometers, or, 600 to 2900 micrometers, or 700 to 2800 micrometers. The fiber volume fraction of the preform is 30 to 50 vol %.

The direct channels are free from char. Char is residual material resulting from pyrolysis and the like. Char can function as scaffolding for matrix deposition and facilitate deposition in the channels before deposition between the fibers.

The preform can have direct channels that extend parallel to each other and may have channels that extend in multiple directions such as parallel and perpendicular. The channels may also extend in directions of varying angles. In some embodiments at least two of the direct channels are perpendicular to each other and lie in the same plane and at least one additional direct channel is perpendicular to the plane. The direct channels may extend between two exterior surfaces or may extend from an exterior surface and end at an interior space.

The direct channels can be formed in the preform by removing a tow from the reinforcing material to form a direct channel in one direction and removing a tow from the reinforcing material in a perpendicular direction to form another direct channel. The intersection of the direct channels in the two directions can then be aligned to form a direct channel in a third direction. Alternatively, the reinforcing may be woven with direct channels in desired locations.

Figure 1:
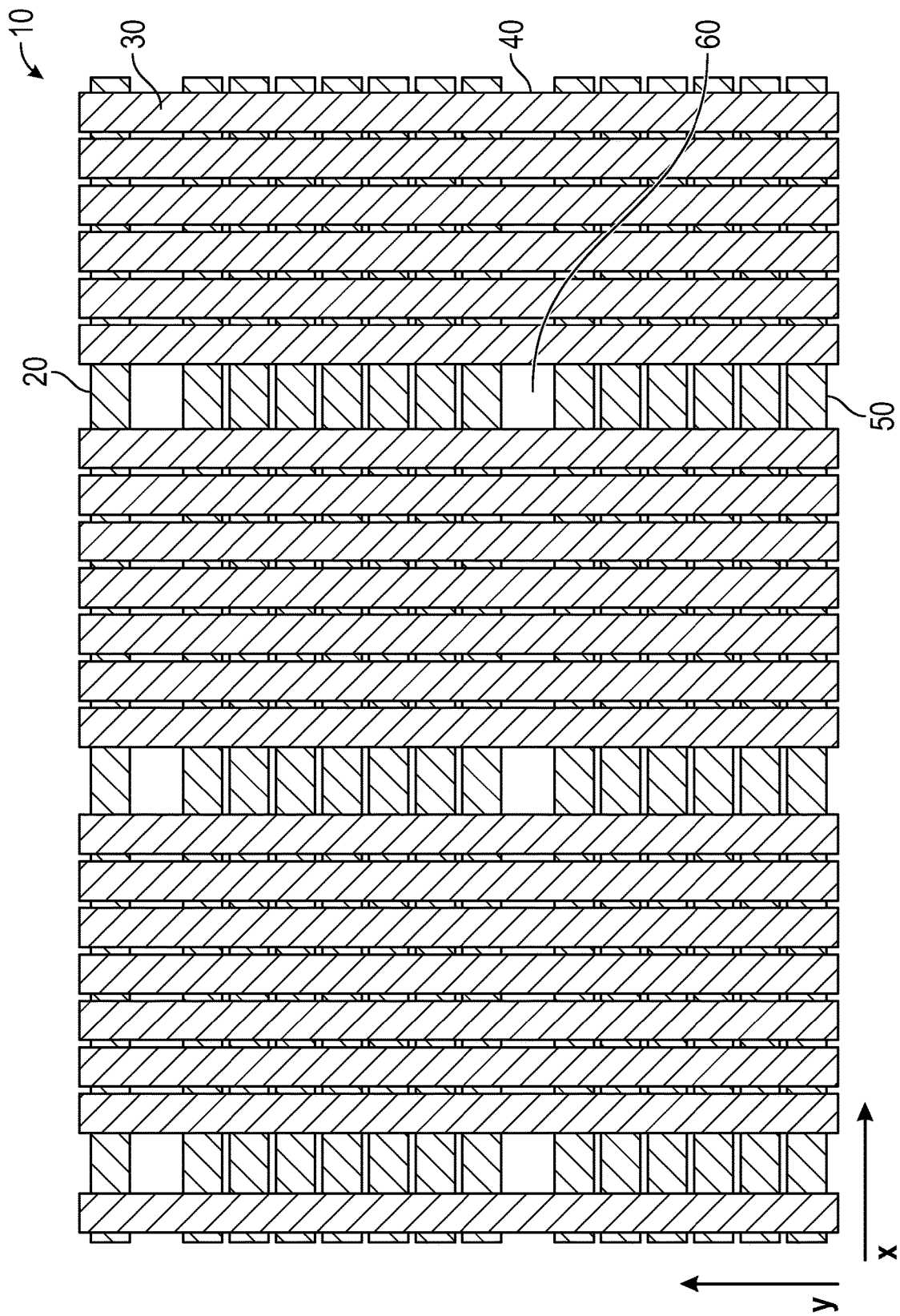
FIG. 1 is a schematic of a preform having direct channels in three directions.

Turning now to FIG. 1, a preform 10 is shown having fibers running in an X direction 20 and fibers running in a Y direction 30. The direct channels 40 in the X direction intersect with the direct channels 50 in the Y direction to form the direct channels 60 in the Z direction (coming out of the page in FIG. 1). For simplicity the cross over points are not shown.

Figure 2:
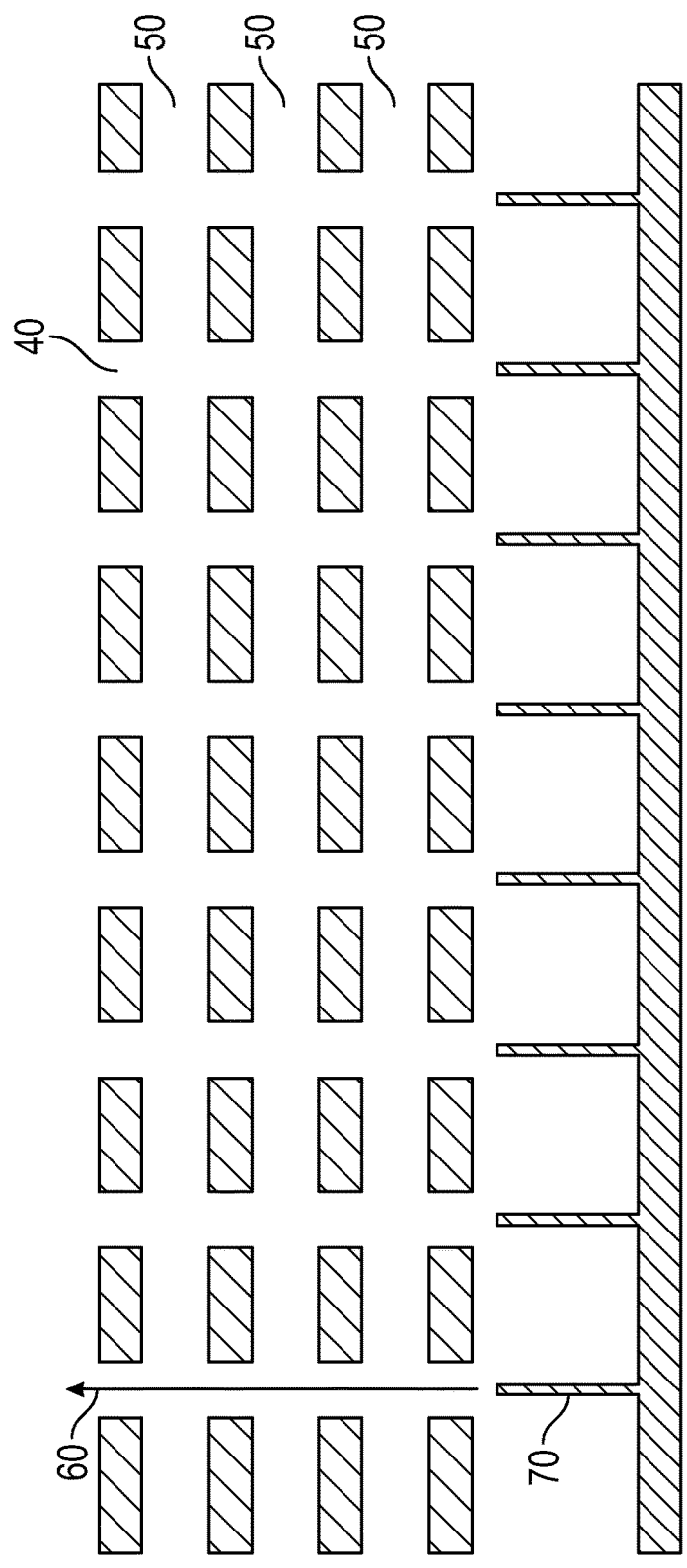
FIG. 2 is a cross section of a preform showing alignment of the Z direction direct channels on alignment devices.

FIG. 2 shows a cross section of a preform through direct channels 50 in the Y direction. Fibers running in the X direction between X direction direct channels are not shown individually for simplicity. The intersection of the Y direction direct channel 50 with the X direction direct channel 40 forms a direct channel in the Z direction 60. Alignment devices 70 may be used to align the intersections of the X and Y direction direct channels to form the Z direction direct channel. Exemplary alignment devices include pins, optical laser alignment and the like. Infiltrating gas may enter and/or exit the preform through the direct channels in any of the three directions, providing a significantly higher amount of edge surfaces to facilitate matrix deposition and result in a ceramic matrix composition having a more uniform microstructure. The direct channels in the preform result in the direct matrix channels in the ceramic matrix composite.

Figure 3:
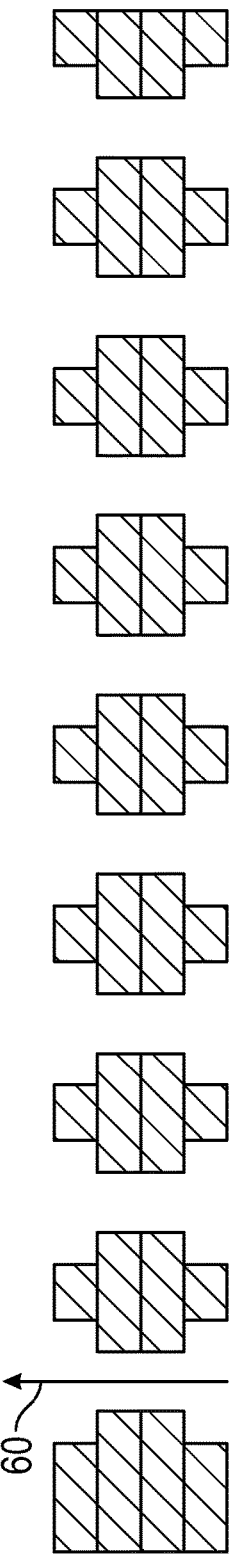
FIG. 3 is a cross section showing direct channels having varying diameters.

FIG. 3 shows a Z direction direct channel 60 having a varying diameter over the length of the channel.

Exemplary CMC materials are silicon-containing, or oxide containing matrix and reinforcing materials. Some examples of CMCs include, but are not limited to, materials having a matrix and reinforcing fibers comprising non-oxide silicon-based materials such as silicon carbide, silicon nitride, silicon oxycarbides, silicon oxynitrides, silicides, and mixtures thereof. Examples include, but are not limited to, CMCs with a silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), yttrium aluminum garnet (YAG), aluminosilicates, zirconium dioxide ($ZnO_2$), zinc oxide (ZnO), and mixtures thereof. Aluminosilicates can include crystalline materials such as mullite ($3Al2O3\ 2SiO2$), as well as glassy aluminosilicates. Other ceramic composite materials that are not comprised of either silicon or oxygen may be used, including carbon, zirconium carbide, hafnium carbide, boron carbide, or other ceramic materials, alone or in combination with the materials noted above.

The method described herein can be used to prepare a variety of components comprising ceramic matrix composites such as components in the aviation industry, marine industry and energy industry. Exemplary components include components for gas turbine engines, such as in high pressure compressors (HPC), fans, boosters, high pressure turbines (HPT), and low pressure turbines (LPT). More specifically exemplary components include combustion liners, shrouds, nozzles, stators, vanes, and blades.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A preform for a ceramic matrix composite comprising reinforcing fibers and direct channels extending from an exterior surface of the preform to end at an interior space of the preform wherein the direct channels are free of char and each direct channel is an open space having no variations in direction of more than five degrees;
   wherein a first plurality of the direct channels are perpendicular to a second plurality of the direct channels, and wherein the reinforcing fibers comprise 30 to 50 volume percent of the preform.

2. The preform of claim 1, wherein the direct channels extend from a first exterior surface to a second exterior surface.

3. The preform of claim 1, wherein the direct channels have a diameter at the interior space of the preform that is less than the diameter at the exterior surface of the preform.

4. The preform of claim 1, wherein the direct channels have substantially the same diameter throughout each direct channel.

5. The preform of claim 1, wherein the direct channels have a diameter of 500 to 3000 micrometers.

6. The preform of claim 1, wherein a third plurality of the direct channels are perpendicular to the first plurality of the direct channels and the second plurality of the direct channels, and the first plurality of the direct channels intersects with the second plurality of the direct channels to form the third plurality of the direct channels.

7. A method of making a ceramic matrix composite comprising:
  forming a preform comprising reinforcing fibers having direct channels extending from an exterior surface of the preform to end at an interior space of the preform wherein the direct channels are free of char and each direct channel is an open space having no variations in direction of more than five degrees, wherein the reinforcing fibers comprise 30 to 50 volume percent of the preform; and
  infiltrating the preform having direct channels with matrix material;
  wherein a first plurality of the direct channels are perpendicular to a second plurality of the direct channels, and wherein the direct channels include infiltrated matrix material.

8. The method of claim 7, wherein forming a preform having direct channels comprises removing at least one tow per layer to make a gap in each layer; and wherein a third plurality of the direct channels are perpendicular to the first plurality of the direct channels and the second plurality of direct channels, and the first plurality of the direct channels intersects with the second plurality of the direct channels to form the third plurality of the direct channels.

9. The method of claim 8, further comprising aligning the gap in each layer on an alignment device.

10. The method of claim 7, wherein infiltrating comprises chemical vapor infiltration.

11. A ceramic matrix composite comprising reinforcing fibers and direct matrix channels extending from an exterior surface of the composite to end at an interior space of the composite wherein the direct matrix channels are free of char and each direct matrix channel has no variations in direction of more than five degrees;
  wherein a first plurality of the direct matrix channels are perpendicular to a second plurality of the direct matrix channels, and wherein the direct matrix channels include infiltrated matrix material;
  wherein the reinforcing fibers comprise 30 to 50 volume percent of the composite.

12. The ceramic matrix composite of claim 11, wherein the direct matrix channels extend from a first exterior surface to a second exterior surface.

13. The ceramic matrix composite of claim 11, wherein the direct matrix channels have a diameter at the interior space of the ceramic matrix composite that is less than the diameter at the exterior surface of the ceramic matrix composite.

14. The ceramic matrix composite of claim 11, wherein the direct matrix channels have substantially the same diameter throughout each direct matrix channel.

15. The ceramic matrix composite of claim 11, wherein the direct matrix channels have a diameter of 500 to 3000 micrometers.

16. The ceramic matrix composite of claim 11, wherein a third plurality of the direct channels are perpendicular to the first plurality of the direct matrix channels and the second plurality of the direct matrix channels, and the first plurality of the direct matrix channels intersects with the second plurality of the direct matrix channels to form the third plurality of the direct matrix channels.

17. The ceramic matrix composite of claim 11, wherein the ceramic matrix composite comprises a matrix and reinforcing fiber.

18. The ceramic matrix composite of claim 17, wherein the matrix comprises silicon carbide, silicon nitride, or a combination thereof and the reinforcing fiber comprises silicon carbide.

19. The ceramic matrix composite of claim 17, wherein the matrix and reinforcing fibers comprise oxide materials.

20. The ceramic matrix composite of claim 19, wherein the oxide materials comprise aluminum oxide, silicon dioxide, yttrium aluminum garnet, aluminosilicates, zirconium dioxides, zinc oxide, and mixtures thereof.

\* \* \* \* \*